United States Patent
Aji

(10) Patent No.: US 11,127,069 B2
(45) Date of Patent: Sep. 21, 2021

(54) RESISTIVE-SENSOR BASED INVENTORY MANAGEMENT DEVICE

(71) Applicant: Adhithi Venkatesh Aji, Pittsburgh, PA (US)

(72) Inventor: Adhithi Venkatesh Aji, Pittsburgh, PA (US)

(73) Assignee: Adrich, Inc., Pittsburgh, PA (US)

( * ) Notice: Subject to any disclaimer, the term of this patent is extended or adjusted under 35 U.S.C. 154(b) by 297 days.

(21) Appl. No.: 16/056,843

(22) Filed: Aug. 7, 2018

(65) Prior Publication Data

US 2020/0051156 A1 Feb. 13, 2020

(51) Int. Cl.
*G06Q 30/06* (2012.01)
*G06Q 10/08* (2012.01)

(52) U.S. Cl.
CPC ....... *G06Q 30/0635* (2013.01); *G06Q 10/087* (2013.01)

(58) Field of Classification Search
CPC .......... G06Q 30/0635; G06Q 10/087
USPC .......... 705/28
See application file for complete search history.

(56) References Cited

U.S. PATENT DOCUMENTS

| | | | |
|---|---|---|---|
| 6,594,535 B1 | 7/2003 | Costanza | |
| 7,809,929 B2 | 10/2010 | Le | |
| 7,965,404 B2 | 6/2011 | Sharma | |
| 9,961,489 B2 | 5/2018 | Elias | |
| 9,990,605 B2 | 6/2018 | Harcar | |
| 10,078,003 B2 | 9/2018 | Gurumohan | |
| 10,169,787 B2 | 1/2019 | Scrivner | |
| 10,177,758 B2 | 1/2019 | Meade | |
| 10,275,740 B2 | 4/2019 | Alvo | |
| 10,339,495 B2 | 7/2019 | Swafford | |
| 10,430,755 B2 | 10/2019 | Aji | |
| 10,466,092 B1* | 11/2019 | Shiee | G01G 15/00 |
| 10,484,127 B2 | 11/2019 | Kim | |
| 10,516,421 B1 | 12/2019 | Bonicatto | |
| 10,524,430 B1 | 1/2020 | Nervino | |
| 10,548,418 B2* | 2/2020 | Gentile | G06K 19/0716 |
| 10,568,071 B2 | 2/2020 | Park | |
| 10,591,345 B2 | 3/2020 | Gurumohan | |
| 10,664,796 B2 | 5/2020 | Aji | |
| 10,670,444 B2 | 6/2020 | Gurumohan | |
| 2003/0135431 A1* | 7/2003 | Schwartz | G06Q 10/087 705/28 |
| 2003/0139982 A1* | 7/2003 | Schwartz | G06Q 10/087 705/28 |

(Continued)

*Primary Examiner* — Garcia Ade
(74) *Attorney, Agent, or Firm* — Dentons Cohen & Grigsby P.C.

(57) ABSTRACT

An inventory management device to measure usage of sheets in a roll has been described. The inventory management device includes a resistive sensor in physical communication with a sheet in the roll that measures a resistance value between the resistive sensor and the sheet. The inventory management device includes a vibration sensor in electronic communication with the resistive sensor to generate a vibration signal that corresponds to a vibration of the roll. The inventory management device includes a storage unit in electronic communication with the resistive sensor to store the resistance value. The inventory management also includes a controller in electronic communication with the resistive sensor and storage unit to measure a change in the resistance value.

20 Claims, 9 Drawing Sheets

(56) References Cited

U.S. PATENT DOCUMENTS

| | | | |
|---|---|---|---|
| 2004/0103048 A1* | 5/2004 | Vitulli | G06Q 10/087 |
| | | | 705/28 |
| 2010/0305530 A1 | 12/2010 | Larkin | |
| 2011/0125116 A1 | 5/2011 | Larkin | |
| 2015/0178654 A1* | 6/2015 | Glasgow | G06Q 10/06315 |
| | | | 705/7.25 |
| 2017/0161676 A1 | 6/2017 | Aji | |
| 2020/0051004 A1 | 2/2020 | Aji | |

* cited by examiner

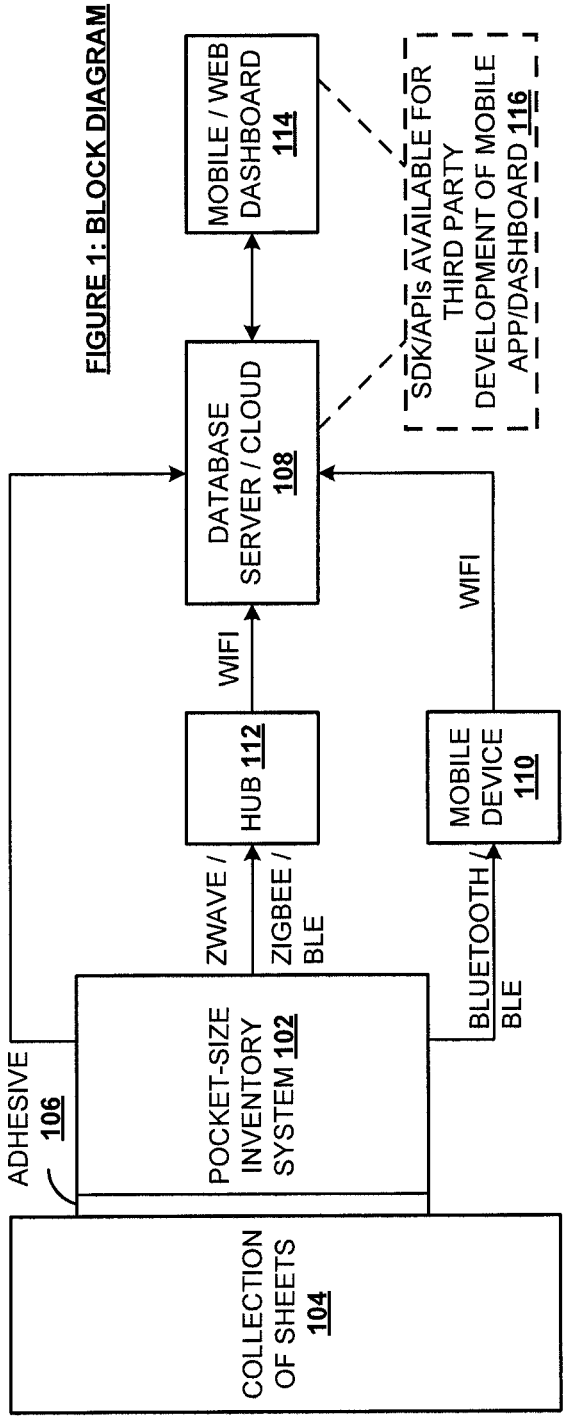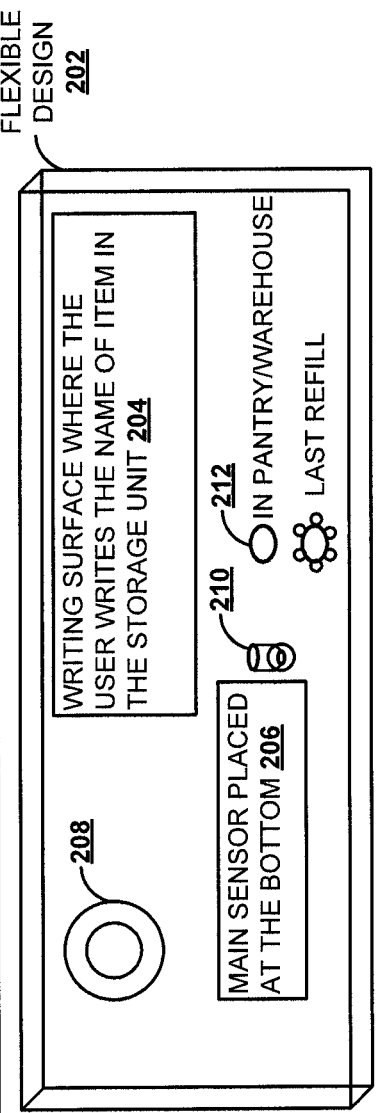

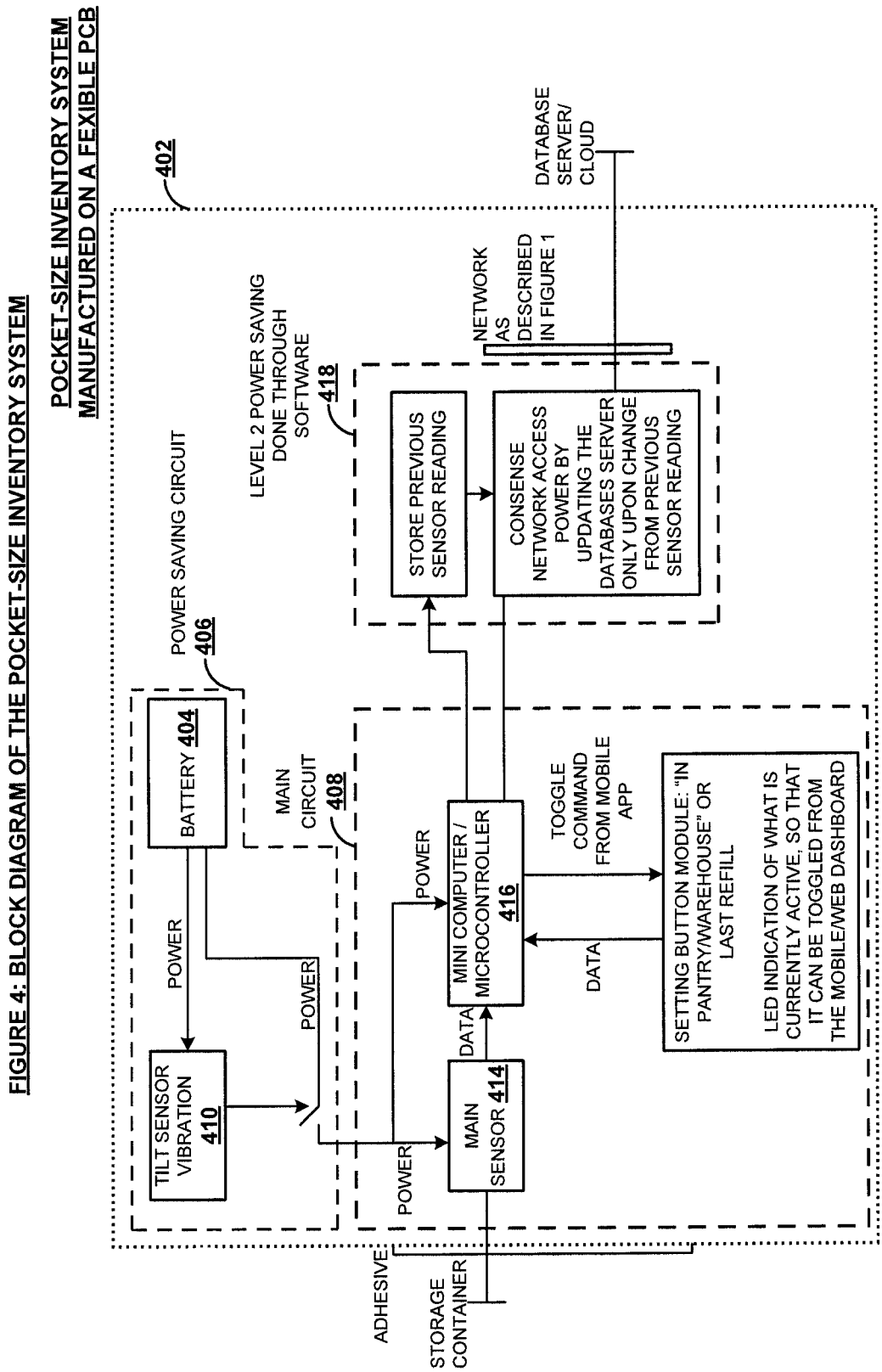
FIGURE 4: BLOCK DIAGRAM OF THE POCKET-SIZE INVENTORY SYSTEM

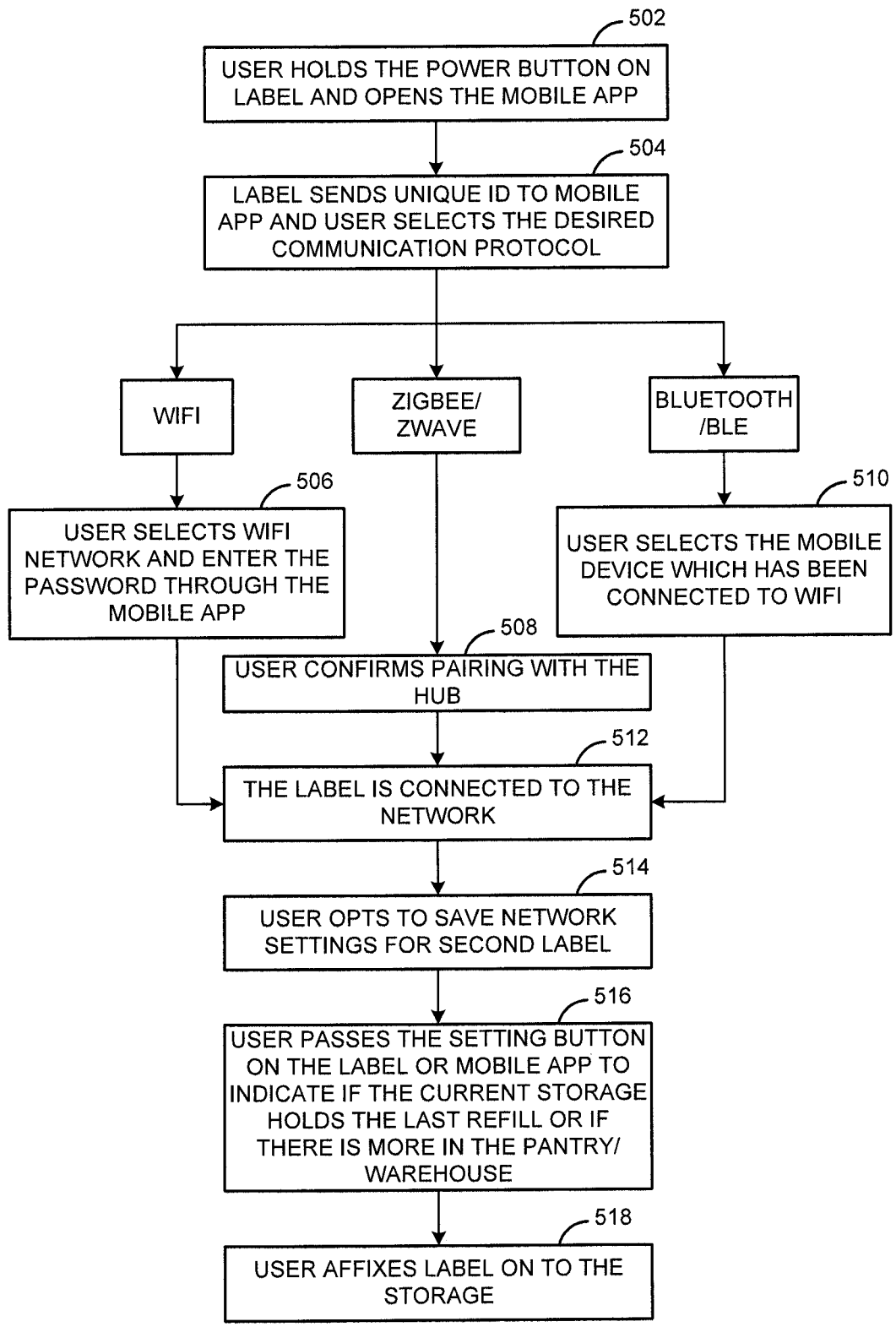

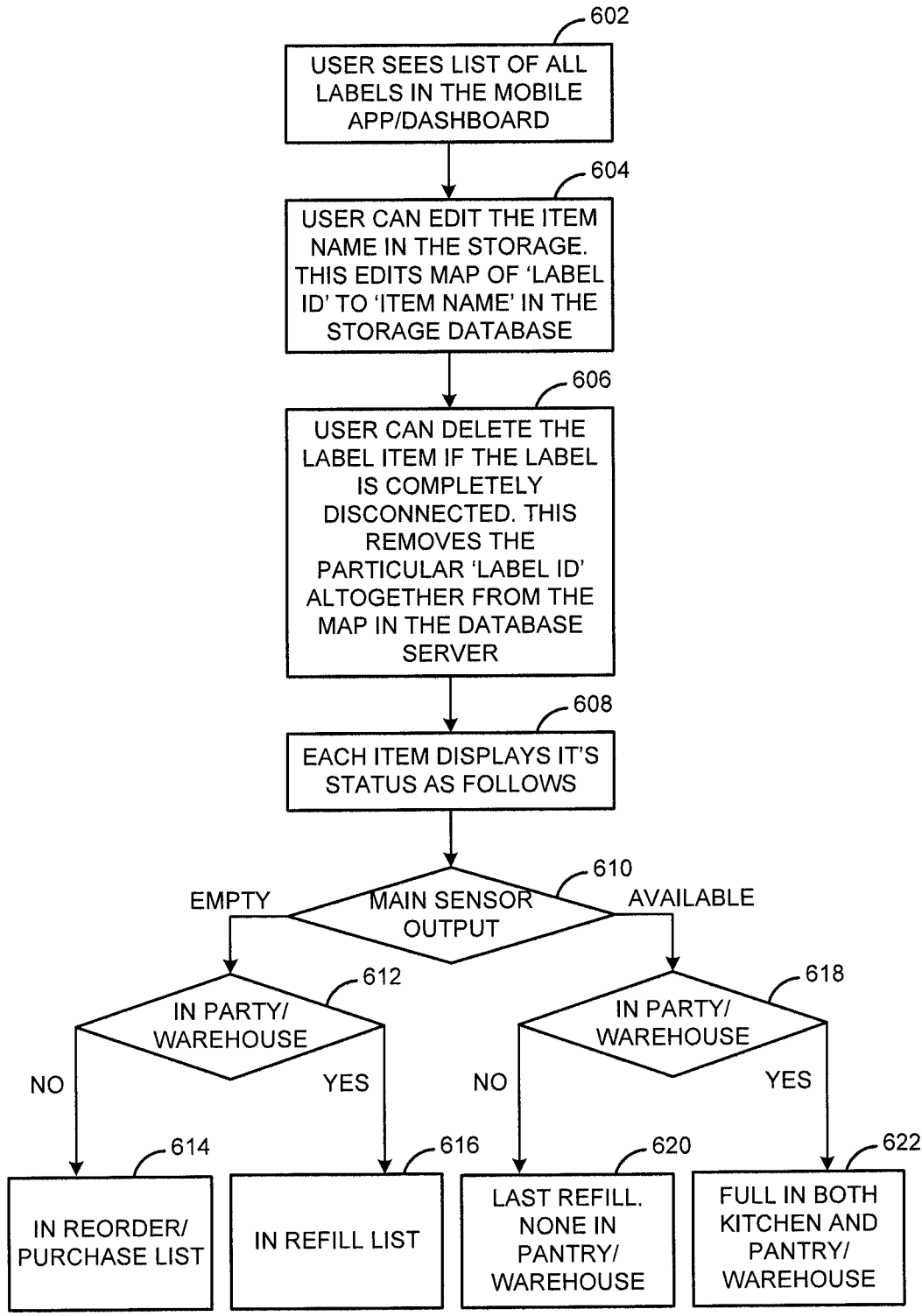

FIGURE 6B: VIEWING ALL STORAGES THAT NEED REORDERING / PURCHASING:
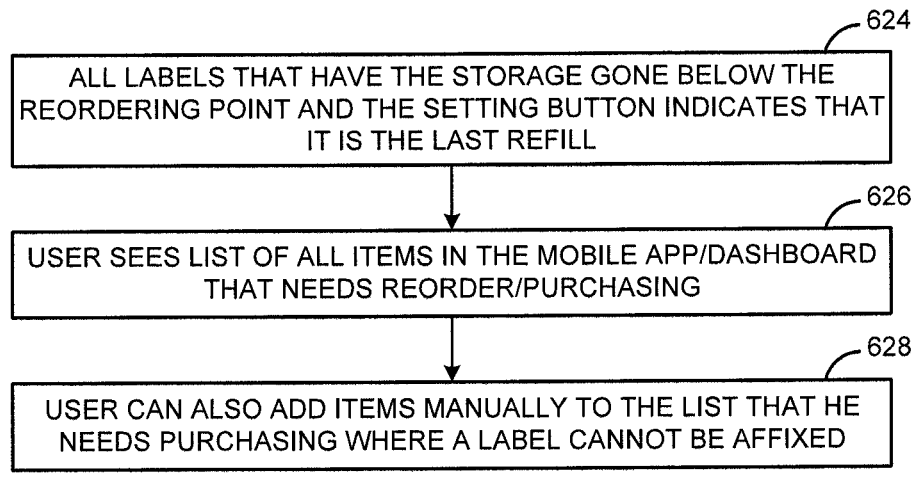
FIGURE 6C: VIEWING ALL STORAGES THAT NEED REFILL FROM PANTRY / WAREHOUSE:
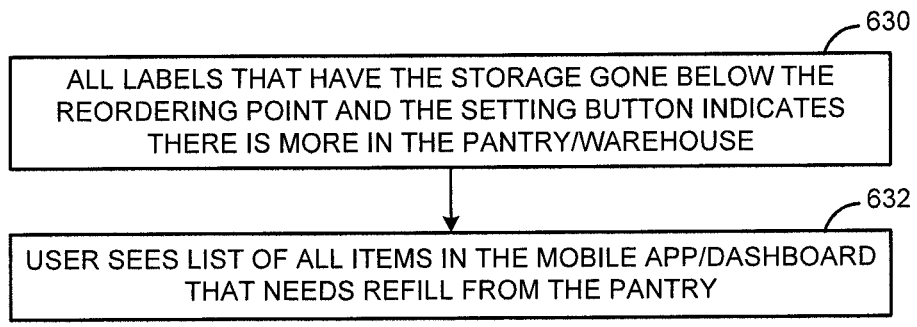

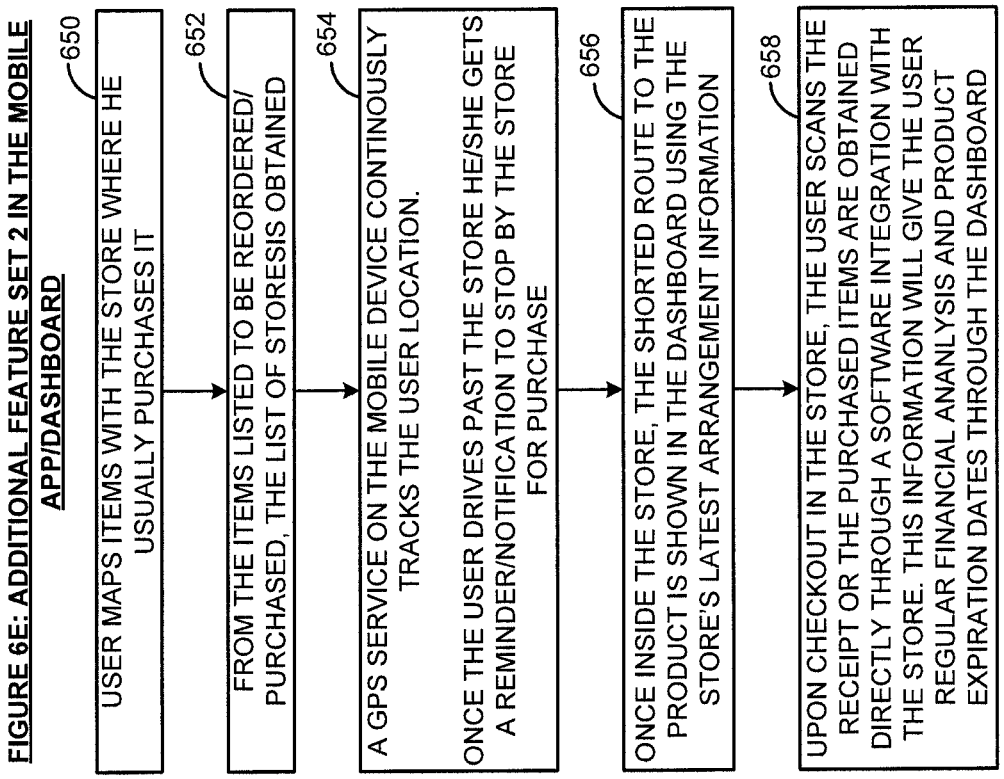
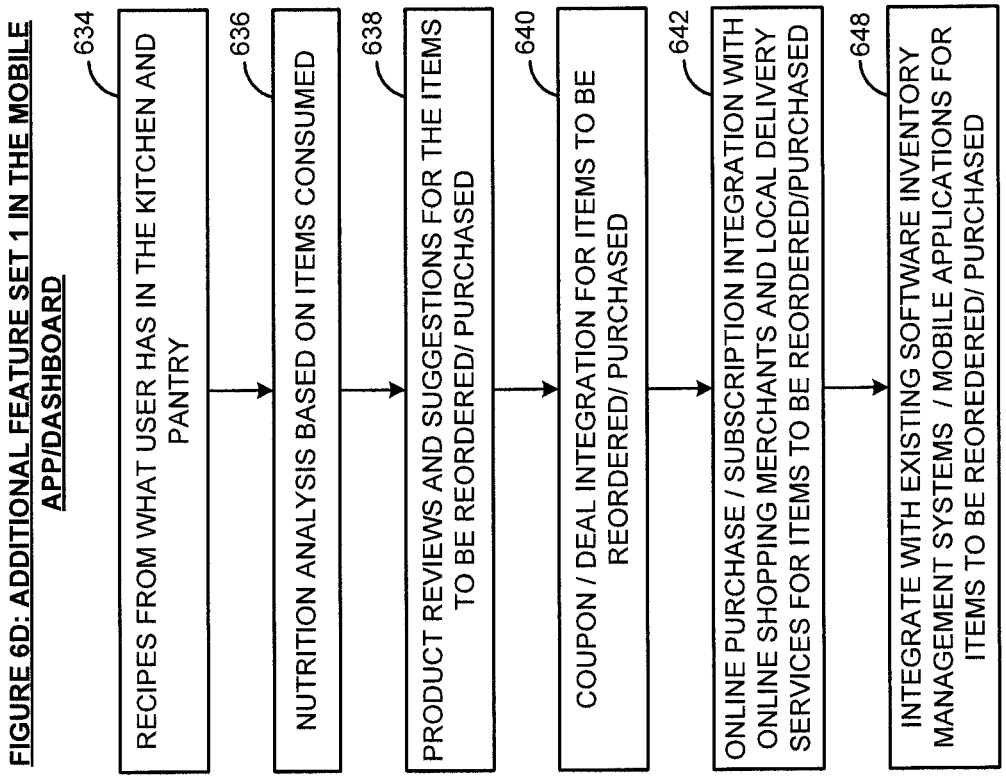

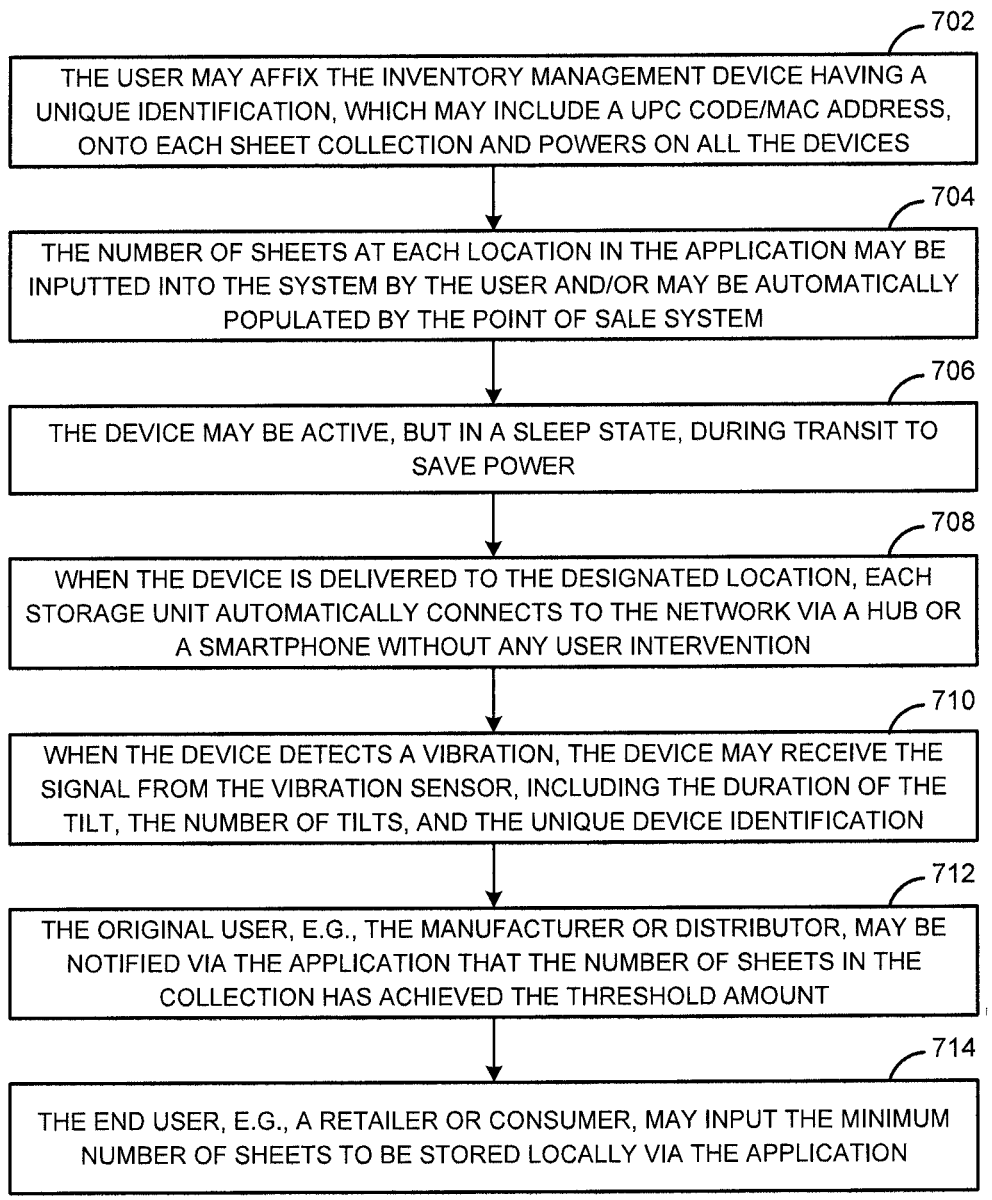
FIGURE 7: CONFIGURATION AND USAGE OF DISPOSABLE LABELS:
*USER = MANUFACTURER
*END USER EXAMPLE = BAR OWNER OR BARTENDER

RESISTIVE-SENSOR BASED INVENTORY MANAGEMENT DEVICE

BACKGROUND

In general, conventional inventory management systems and methods are labor intensive and time consuming. For example, a user may have to visually inspect the container to determine the level or quantity of the substance in the container and/or whether the container needs replenishment. Replenishments are ordered manually. In addition, conventional inventory management systems may use special containers that are expensive to manufacture and too large for certain applications. Accordingly, more efficient and/or cost-effective inventory management systems and methods of making and using the same are desirable.

BRIEF DESCRIPTION OF DRAWINGS

The various embodiments described herein may be better understood by considering the following description in conjunction with the accompanying drawings.

FIG. 1 includes a block diagram of an inventory management system.

FIG. 2 includes a perspective view showing an inventory management device.

FIG. 4 includes a block diagram of an inventory management system.

FIG. 5 includes a flow chart illustrating a method of inventory management.

FIGS. 6A-6E include flow charts illustrating methods of inventory management.

FIG. 7 includes a flow chart illustrating a method of inventory management.

DESCRIPTION

Figure 3:
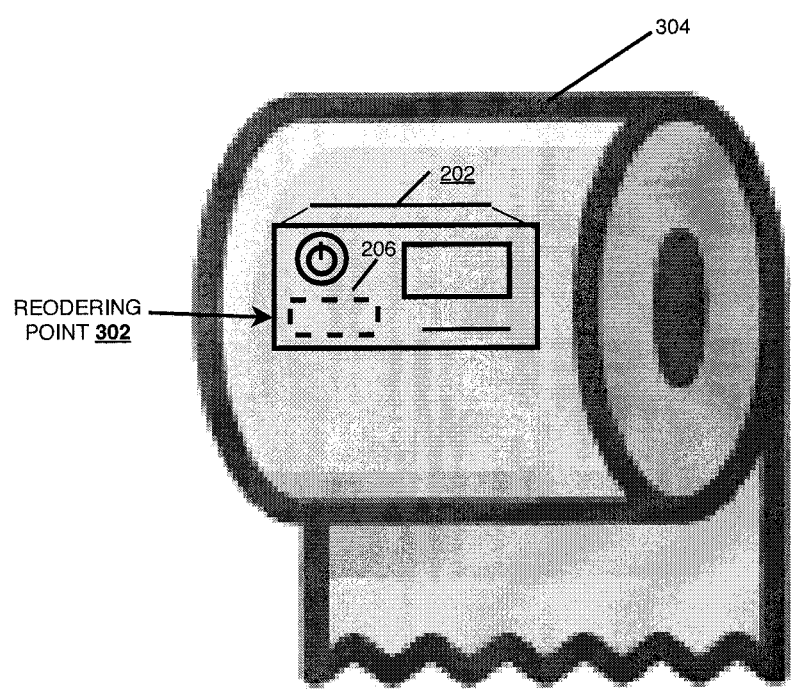
FIG. 3 includes a front view of an inventory management system having a replenishment threshold.

As generally used herein, the articles "one", "a", "an" and "the" refer to "at least one" or "one or more", unless otherwise indicated.

As generally used herein, the terms "including" and "having" mean "comprising".

In the following description, certain details are set forth in order to provide a better understanding of various aspects of inventory management systems and methods of making and using the same. However, one skilled in the art will understand that these aspects may be practiced without these details and/or in the absence of any details not described herein. In other instances, well-known structures, methods, and/or techniques associated with methods of practicing the various aspects may not be shown or described in detail to avoid unnecessarily obscuring descriptions of other details of the various aspects.

According to various aspects, more efficient and/or cost-effective inventory managements and methods of making and using the same are described.

The inventory management devices and systems may be used by end users, retailers, distributors, and manufacturers of consumer goods to collect, track, and/or process product usage data.

The inventory management devices, sometimes referred to as a label, may be coupled to a collection of sheets, for example, a paper stack or a paper roll. After the collection of sheets leaves the manufacturer and/or distributor and travels through the supply chain to the end user, which could be a business entity or a consumer, the label may collect and transmit product data to be displayed via a computer interface, such as a mobile application, web application, and computer. The end user may connect the label to the internet via WIFI, BLUETOOTH, (Bluetooth Low Energy) BLE, LoRa, NB-IoT, or any network interface or network hub. The interface may be used by the manufacturer and/or distributor to directly communicate with the retailer and/or end user. The manufacturer and/or distributor may facilitate communications with the retailer and/or end user, such as targeted promotions, recipes, and need based subscription services. The retailer and/or end user may use the interface to reorder the product, provide feedback to the manufacturer and/or distributor, and/or communicate with the manufacturer and/or distributor.

Once the end user connects the label to the network, the inventory management devices and systems may be completely automated to track the number of sheets in the collection of sheets, usage data, including when, where, and how often the sheets are used, consumer demographics, and when a reorder of the sheets is desirable. For example, the system may transmit a notification to the end user, retailer, distributor, and manufacturer of the product, when the number of sheets connected to the networks achieves a threshold amount.

The label may connect to a network interface without human intervention. For example, the label may connect to a network interface controlled by the manufacturer and/or distributor without intervention by the end user. The label may connect to the network via LoRa or NB-IoT, for example. The label may autonomously track the number of remaining sheets in the collection of sheets, usage data, including when, where, and how often the product is used, consumer demographics, and when a reorder of the sheets is desirable. The label may autonomously transmit a notification to the end user, retailer, distributor, and manufacturer of the sheets when the number of sheets in the collection connected to the networks achieves a threshold amount. The label may autonomously track and/or transmit without a "command" signal being received by the label or initiated by the end user. Autonomous tracking and/or transmission may improve the efficiency and/or reduce the possibility of human error by minimizing the dependency on the end user to have a network hub and associated hardware necessary to communicate and interact with the label. The label comprise a software development kit (SDK) to capture and report real-time data via, and may allow the compiling of data reports for each manufacturer and/or distributor in discrete time periods, on demand, randomly or continually for more than one label to provide the manufacturer and/or distributor data at an aggregate level. The label may be configured to validate incoming requests to assure they are coming from the manufacturer and/or distributor or other verified party. The SDK may be configured to allow other home automation devices to connect to as well.

The inventory management devices and systems may be used for new product testing. Conventional systems and methods used by manufacturers and distributors to test new product concepts may be problematic. The results from the self-selected consumers may be biased. The self-selected consumers may have to manually input the activity tracking information, which may result in human error and, ultimately, suboptimal decisions in positioning and marketing of the product. The inventory management devices and systems described herein may facilitate automated testing and/or collection of product usage data with minimal or no human intervention, and/or randomized sampling. The inventory management devices and systems described herein may facilitate testing multiple product concepts to determine the most profitable and/or desirable product to go into production. The testing results obtained using the inventory management devices and systems described herein may be less biased and/or unbiased relative to conventional methods to provide a faster time to market and better success rate in new product launches.

The inventory management devices and systems may be used to optimize stocking of a product or group of products. Retail sales data may be different from actual consumption data. This may lead to lost sales when the retail sales data is less than the actual consumption data or unused inventory when the retail sales data is greater than the actual consumption data. The product usage data collected, processed, and transmitted by the inventory management devices and system may be used to identify consumption patterns for a product for a specific location or geographic area, such as within a city, and thereby the optimum stocking level of the product at each retail store in the geographic area based on usage.

The inventory management devices and systems may be used to facilitate a need based subscription model in which the customer receives the goods/services as needed. Conventional subscription business models generally require a customer to purchase the goods/services at a predetermined frequency, such as every month or week, and thereby, the customer may over purchase or under purchase the goods/services. Conventional subscription business models are generally not based on the need of the customer. Conventional subscription business models may experience a high attrition rate, sometimes referred to as a churn rate. A need based subscription business model may be based on the actual goods/services usage over a certain period of time. As described above, the goods/services usage data collected, processed, and transmitted by the inventory management devices and system may be used to identify consumption patterns to provide for a need based subscription model that allows users to subscribe for the optimum level of the goods/services based on usage.

The inventory management devices and systems described herein may collect, process, and/or transmit product usage data that may be used by manufacturers and distributors of consumer goods to capture the fluctuations in consumer demand, optimize production, measure the effectiveness of targeted promotions, and for competitive benchmarking and onboarding a new location/customer.

An inventory management system may be characterized by a band-type inventory device having one or more sensors, where the device is flexible and attachable to a collection of sheets, for example, a paper roll or a paper stack. The inventory management system may be further characterized by a customizable reordering point to automate inventory management of the material and reduce/eliminate manual intervention. The inventory management device may be agnostic to the size and shape of the collection of sheets. The inventory management device may comprise a power saving circuit to allow continued usage of the device without the need to recharge the battery.

The inventory management system may be characterized by one or more of the following, as described in more detail below: (1) a unique identifier, such as a UPC code or a media access control address (MAC address), for each device to collect when, where, how often and when each collection of sheets achieves the threshold amount, (2) collect consumption data, including the rate of consumption and when the number of sheets in the collection achieves a Reorder Point (ROP); (3) comprise a vibration sensor, e.g., an accelerometer or gyroscope, to detect a vibration when a sheet is removed from the collection of sheets; (4) measure the number of independent vibrations to count the number sheets removed from the collection of sheets; (5) determine the number of sheets remaining in the collection of sheets; (6) using BLUETOOTH or BLE (Bluetooth Low Energy) to collect sheet usage information while scanning, i.e., instead of transmitting the identifier for each device, it sends out a unique string with status encapsulated that serves as the device identifier; (7) detect when the collection of sheet is opened; (8) automatically connects to the network; (9) after detecting a vibration, the device may measure the resistance of the collection of sheets or lack thereof and transmit the resistance value to a database and/or store the resistance value in a store unit to be transmitted at a later time, such as when the number of sheets in the collection achieves a threshold level; (10) having a minimally intrusive design and applicability to conventional manufacturing processes with minimal redesign of such manufacturing processes; (11) an active battery having narrow thickness such that it may be embedded in the label coupled to the container; (12) a battery that may be active through transit and configured to maintain power using intelligent power saving modes; (13) automatic data collection, processing, and communication, e.g., when the end user activates the device, it may automatically connect to a hub and automatically begin collecting product usage data when a vibration is detected, and/or the hub may advertise at any period of time desired by the user, e.g., 1 hour, and/or when all or substantially all vibrations are detected, to wake up the device and begin collecting and/or transmitting the product usage data; and (15) collecting the product usage data during the advertising itself, e.g., the handshake signal may transmit the packet with the data of unique identification, status, and number of vibrations.

Referring to FIG. 1, an inventory management device 102 may attach to a collection of sheets 104. The collection of sheets 104 may be a roll of sheets, a stack of sheets, etc. Examples of the sheets may include, but are not limited to, a paper, plastic, cloth, or any other solid material. The collection of sheets 104 may comprise an adhesive 106 on one of the sheet in the collection at a customizable reordering point desired by the user. The reorder point ("ROP") is the amount of material that triggers an action to replenish that particular material. The inventory management device may comprise at least one sensor to measure the number of sheets in the collection of sheets. The inventory management device 102 may comprise a transmitter to transmit the measured value to a server 108 in a remote location. The sensor may transmit the measured value to the server 108 by WIFI. The transmitter may comprise a BLUETOOTH or a BLE (Bluetooth low energy) transmitter to communicate to a mobile device 110. The mobile device 110 may act as a modem to communicate with the server 108. The transmitter may comprise a low-power wireless local area network to communicate through a hub 112 with the server 108. The low power communication protocol may comprise ZIGBEE/ZWAVE. The server 108 may comprise software to provide two way communication with a dashboard 114. The dashboard 114 may comprise a web or mobile application. Additionally, the software may comprise a software development kit 116 including an application program interface (API) to develop any third party software tools. For example, the device may integrate into data analytics/postpurchase consumer electronics platforms seamlessly through the API to build an ecosystem.

Referring to FIG. 2, the inventory management device may comprise a label that may be in contact with the collection of sheets. The inventory management device may comprise a flexible, reusable, non-intrusive device that may be surmounted to the external surface of the collection of sheets 104. The inventory management device 202 may comprise a label 204 having a writing surface for the user to identify the contents of container. The inventory management device may be agnostic to the size and shape of the collection of sheets 104.

Referring to FIG. 4, the inventory management device may comprise a power saving circuit to minimize power consumed such that the user may not need to recharge the battery during use. The power saving circuit, and thereby power consumption, may be related to the vibration of the collection of sheets.

The inventory management device may be characterized by the following dimensions: up to 200 mm high, such as 1-200 mm, and 50-127 mm, up to 200 mm wide, such as 1-200 mm, and 50-127 mm, and up to 50 mm thick, such as 0.1-50 mm. The inventory management device may comprise other shapes and dimensions as desired.

The inventory management device may comprise at least one sensor, such as a vibration sensor 410 and an environmental sensor (not shown). Referring to FIG. 4, the power saving unit may comprise a level sensor 206. The level sensor 206 may be positioned at the bottom of the inventory management device to allow the user to set the ROP by aligning the sensor to the desired ROP. The environmental sensor may be positioned anywhere on the label that is determined by the hardware design, for example, adjacent or proximate the level sensor at the bottom of the label of the inventory management device.

The environmental sensor may comprise one or more of an image sensor, moisture sensor, temperature sensor, humidity sensor, air quality sensor, light sensor, motion sensor, audio sensor, magnetic sensor. The environmental sensor may be connected to the battery and transmit a signal to the storage unit. In addition to the consumption data provided by the label to the manufacturers and/or distributors, environmental data may be used to notify the manufacturers and/or distributors the status of the material. The label may be configured to notify the manufacturers and/or distributors and/or the end user when the sheets have been exposed to environmental conditions that impairs its principle of operation or its intended purpose. For example, in case of a toilet roll, the label may notify the end user that the toilet roll is damp and not fit for use.

The level sensor may comprise one or more of a piezoelectric sensor, a magnetic float level sensor, a mechanical float level sensor, a pneumatic level sensor, a conductive level sensor, an ultrasonic level sensor, a resistance level sensor, a capacitance level sensor, an inductive proximity sensor, an optical sensor, a microwave sensor, magnetostrictive level sensor, resistive chain level sensor, magnetoresistance float level sensor, hydrostatic pressure level sensor, an air bubbler system, and a nuclear level gauge, such as a gamma ray gauge, or any other sensor configured to detect a change in the number of sheets in the collection of sheets.

When the user attaches the inventory management device 102 to the container 104, turns on the power button 208 and maps the number of sheets in the collection to a dashboard 114, which may run on a mobile device or a computer, and configures the inventory management device to a wireless communication protocol, the dashboard 114 may notify the user when the quantity or number of sheets reaches or falls below the ROP. After receiving the notification, as shown in FIG. 1, the user may manually reorder a replenishment to achieve a desired number of sheets, or the inventory management system may be programmed to automatically reorder the replenishment number of sheets. The inventory management device may integrate with conventional inventory management software, as illustrated in FIG. 6A.

The inventory management device 102 may comprise a switch/setting button 210 to toggle LED 212 to allow the user to receive a replenishment notification when the last refill when locally stored stock of the sheet, such as in a pantry or cabinet in a household application or store room in other small businesses, is at or below the ROP, or is absent. Instead of reordering the material, the user may receive a notification to replenish the collection with sheets from a local larger sheet container. The LED 212 may be changed through the dashboard 114.

In use, the inventory management system may automatically monitor the quantity of sheets in the collection, collect and record inventory information or data, and reorder sheets with minimal or no manual intervention. The inventory management system may provide the user with real time inventory information and access to such inventory information. The inventory information may comprise a timestamp including the date, hour, minute, and second of each use of the sheet or each vibration, and when the number of sheets achieves the ROP, demographics of the user, frequency of use of the sheets, location of the collection, number of sheet collections connected to the network having an amount greater than the threshold amount and/or an amount equal to or less than the threshold amount, weather, geography, environmental conditions, and events, for example. The inventory information may be stored in a storage unit and transmitted to a database when the ROP is achieved.

The inventory management system may be modular and configured to integrate with any other third party inventory management hardware and software (e.g., software development kit, "SDK") 116.

FIG. 3 illustrates a front view of an inventory management system having a replenishment threshold. The user may use the inventory management device to set the ROP and collect and monitor the quantity of sheets in the collection.

The inventory management device may be positioned on an outer surface of the sheet collection. In one embodiment, the inventory management device may be wrapped around the sheet collection using an elastic material or a rubber band. The bottom of the inventory management device may set the ROP 302 or the amount when the user desires to be notified about the number of sheets in the container. The level sensor 206 may be positioned at the bottom of the inventory management device. Therefore, the user may customize the ROP 302 according to the user's minimum inventory needs or safety stock by adjusting the position of the inventory management device. The inventory management device may be surmounted on any container notwithstanding the shape or size of the container.

FIG. 4 includes a block diagram of an inventory management system. The inventory management device 102 may comprise a flexible printed circuit board (PCB) or printed electronics 402. The power module may comprise a battery 404 to power the main circuit 408 and a power saving circuit 406. The power saving circuit 406 may comprise a vibration sensor 410, such as a tilt sensor, directly connected to the battery 404 such as by a switch 412. The switch 412 may connect the battery 404 to the vibration sensor 410 and main circuit when closed. The vibration sensor 410 may be constantly powered on when the switch 412 is closed. The vibration sensor 410 may control the main circuit 408 by transmitting a wakeup signal interrupt to the controller. The controller may be programmed to control the sensitivity of vibration sensor 410 by regulating the voltage. When the vibration sensor 410 detects a vibration, the controller may be programmed turn on the main circuit 408.

When the user powers the device 102 on, the switch 412 closes to connect the battery 404 to the power saving circuit and the main circuit. When the vibration sensor 410 detects a vibration, the controller may be programmed to transmit a signal, e.g., sleep wakeup signal, to the main circuit 408 to turn on the main circuit 408. The controller may be programmed to control the sensitivity of vibration sensor 410 by regulating the voltage. The sensitivity of the vibration sensor 410 may be relative to the force applied to remove a sheet from a collection of sheets, for example, a sheet roll.

The vibration sensor may comprise one of an accelerometer, a tilt sensor, a proximity sensor, a position sensor, and a transducer. The vibration sensor may be coupled to an exterior surface of the lid of the container to detect when a sheet is pulled from the collection of sheets. In one embodiment, the total number of vibrations may be detected until the sheets in the collection is over.

The battery may comprise one of a flexible battery and a printed battery. The battery may or may not be rechargeable. The battery may comprise one of a kinetic energy powered battery, a fuel cell, a thermal power source, a lithium-ion battery, a solar panel connected to a battery, a zinc air battery, a button cell battery, a Tesla coil, a printed battery, a flexible battery, a battery made of organic matter, and an alkaline battery. The battery may be characterized by a low capacity.

The inventory management device may be manufactured using a printed circuit board method including a rigid substrate or flexible substrate, a printed electronic method, a thin-film deposition method, machining, sintering, or any other known or desired method known to a person of ordinary skill in the art. The inventory management device may comprise an array of conductive materials for electrodes bonded to a thin dielectric flexible film on an insulating substrate. Exemplary conductive materials for electrodes include, but are not limited to, copper, silver, gold, aluminium and their alloys, their coatings and inks, or any other desired material or combination of materials known to a person of ordinary skill in the art. Exemplary insulating substrate materials include, but are not limited to, various resin laminates, glasses, ceramics and plastic sheets and tubes, or any other desired material or combination of materials known to a person of ordinary skill in the art. The inventory management system may also include a resistive sensor, for example, a flex sensor that changes its resistance value based on the bending of the sensor.

The controller may be programmed to turn on the main circuit 408. For example, the controller may be programmed to turn on a timer when the first vibration is detected. The timer may comprise a time period sufficient for the material to stabilize or achieve equilibrium after a vibration. The time period may be from at least 1 second up to 1 hour. If another vibration is detected before the timer expires, then the controller may be programmed to reset the timer to start again. The expiration of the timer may indicate that the user stopped using the container. When the timer expires, the controller may be programmed to turn on the main circuit 408.

The main circuit 408 may comprise the main sensor 414, a minicomputer 416 including a wireless module and modem. The main sensor 414 may be connected to the minicomputer 416. The minicomputer 416 may be programmed to control the main sensor 414. Alternative, the main sensor 414 may comprise the minicomputer 416. As described above, the main circuit may be powered on intermittently as determined by the power saving circuit 406. The main sensor 414 may comprise one or more of the environmental sensor, resistance sensor, vibration sensor, capacitive sensor, storage unit, controller, and transmitter.

The main sensor 414 and the minicomputer 416 may be connected in series and directly connected to the battery 404. The main sensor 414 may detect the quantity of sheets in the collection of sheets. The main sensor 414 may transmit a low voltage signal to the minicomputer 416 when the quantity of sheets is at or below the ROP.

The main sensor 414 may comprise one of a resistive level sensor and an ultrasonic sensor. The resistive level sensor may comprise a capacitive proximity switch. The resistive level sensor may be characterized as a non-intrusive sensor attached to an outer surface of the collection of sheets. The resistive level sensor may measure a change in resistance of the sheets in the collection. The resistive level sensor may comprise a flex sensor that wraps around the collection of sheets. When a sheet in the collection is pulled then the bend of the resistive sensor, wrapped around the collection, may increase/decrease. The change in resistance may be outputted as a voltage signal to the minicomputer as an interrupt signal. The resistance level sensor may determine the presence or absence of the sheet at that ROP. The main sensor 414 may comprise a copper strip.

The minicomputer 416 may receive and process the input value. The minicomputer may be programmed to reduce the power consumption. The minicomputer may store one or more input values. Referring to FIG. 1, the minicomputer may be programmed to send the input valve via the WIFI module to the server 108 when the input value transmitted by the capacitive level sensor is different from the stored input value on the minicomputer 416. The input value may be transmitted to the server using the communication channels as set by the user in the initial setup. The input values may be collected for a desired period of time, and stored in a database, such as server 108, and/or the storage unit. The database may be used to aggregate and correlate inventory information that may be useful in other business applications or business decisions.

The main sensor 414 may use less power to operate compare to conventional inventory management devices because the battery is not always on but turned on intermittently via circuit 2. The inventory management system may communicate with the server only when the signal transmitted by the resistive sensor value from is different from the stored valued thereby limiting the usage of and power consumed by the BLUETOOTH, BLE, ZIGBEE/ZWAVE, WIFI, LoRa, and/or NB-IoT module(s).

Referring to FIGS. 5 and 6A-6E, the inventory management system may be used for household inventory management. However, a person having ordinary skill in the art would appreciate that the inventory management system 102 may be used to manage the inventory of liquid vending machines, bakeries, bars, coffee shops, food courts, pharmacies and other applications that may benefit from inventory management of containers of solids, liquids, gases, and gels. The inventory management system may be used in by distilleries, craft distilleries, pharmacies, publishers in the printing industry, cosmetic and perfume industry, and manufacturers of cleaning supplies.

The transmitter may comprise at least one of BLUETOOTH communication, a radio-frequency identification (RFID) communication, a near-field communication (NFC), or a personal area network (PAN) communication to connect to a WIFI or Ethernet communications network or machine-to-machine (M2M) wireless communications network; ZIGBEE/ZWAVE communication; LoRa communication; and NB-IoT communications.

FIG. 5 includes a flow chart illustrating the installation and setup of a networked inventory management system. At 502, a user may hold the power button of the inventory management device and access a mobile application. At 504, the inventory management device may transmit a unique identification to the mobile application, and the user may select a desired communication protocol. The communication protocol may comprise WIFI, ZIGBEE/ZWAVE, or BLUETOOTH. The user may select WIFI at 506, for example, and enter a password through the mobile application. At 508, the user may select ZIGBEE/ZWAVE and confirm pairing with the hub. At 510, the user may select BLUETOOTH and a mobile device that is connected to WIFI. The inventory management device is connected to the network at 512. At 514, the user may save the network settings to connect another inventory management device to the network. At 516, the user may attach the inventory management device to the outer surface of the container.

FIG. 6A-6E include flow charts illustrating a method of inventory management of a plurality of sheet collections having the inventory management device described herein. In FIG. 6A, at 602, a user may view the status of each of the inventory management devices via the dashboard and/or mobile application. At 604, the user may edit inventory information, such as the name or ID of the container associated with the inventory management device and the material stored therein. The inventory information may be stored in the database. At 606, the user may delete the inventory information when the inventory management device is disconnected from the network to remove the respective ID from the map in the database.

At 608, each inventory management devices may displays its status as one of "empty" or "available" based on the main sensor 610 output. At 612, the inventory management devices may be programmed to check if additional sheets are stored locally. Referring to FIG. 6B, at 614, the inventory management devices may be programmed to reorder the sheets when additional material is not available locally. Referring to FIG. 6C, at 618, the inventory management devices may be programmed to add sheets to the refill list when additional material is available locally. At 618, the inventory management devices may be programmed to check if the additional sheet is stored locally. At 620, the inventory management devices may be programmed to list the container as the last refill when the material is not available locally. At 622, the inventory management devices may be programmed to list the sheet as "available" when the sheet is available locally.

FIG. 6B includes a flowchart illustrating a method of inventory management of a plurality of sheet collections having the inventory management device described herein that need reordering/purchasing. At 624, the inventory management system may be programmed to identify each of the sheet collections having a quantify of sheet equal to or less than the ROP and identified as "last sheet refill" by button 210 (see FIG. 2). At 626, the user may view the list of sheets in need of reordering/purchasing via the dashboard or mobile application. At 628, the user may manually add items to the list.

FIG. 6C includes a flowchart illustrating a method of inventory management of a plurality of sheet collections having the inventory management device described herein that need refilling from material available locally. At 630, the inventory management system may be programmed to identify each of the collections having a level or quantity of sheets equal to or less than the ROP and identified as "available" by button 210 (see to FIG. 2), At 632, the user may view the list of collections in need of refiling from locally stored sheets via the dashboard or mobile application.

FIG. 6D illustrates a block diagram of the dashboard and/or mobile application. At 650, a user may identify sheets and sources for such sheets. The inventory management system may be programmed to identify and list sources for the materials at 652. At 654, a GPS service on the user's mobile device may continuously track the user location. For example, when the user is proximate to a store having the material, the inventory management system may be programmed to notify the user to purchase the material from the store. At 656, once inside the store, the inventory management system may be programmed to identify the shortest route to the sheet in the dashboard using the store's latest arrangement information. At 658, upon checkout from the store, the user may scan the receipts or the purchased materials may be obtained directly through software integration with the store. The inventory management system may be programmed to store this data. This data may be used for correlation and analytics to provide consumers with recommendations for saving from grocery spend analysis and other financial analysis.

Referring to FIG. 7, illustrates a method of configuring and using the inventory management system. At 702, the user may affix the inventory management device having a unique identification, which may include a UPC code/MAC address, onto each sheet collection and powers on all the devices. The user may access the user interface, e.g., the mobile application, to receive the threshold level from a reference database and calibrates each of the devices via the hub. The threshold value may comprise a resistance value and/or a time of return pulse, or a change in the resistance value and/or time of return pulse. The time of return pulse may be calculated using program ticks. For example, the controller and/or the resistance level sensor may transmit a pulse to measure the resistance of the material. The time of return pulse when the sheet collection achieves the threshold amount may be different from the time of return pulse when the number of sheets is greater than the threshold amount. At 704, the number of sheets at each location in the application may be inputted into the system by the user and/or may be automatically populated by the point of sale system. The user may input other mapping information, such as the product line for each unique identification, via the application that may be stored in the database. At 706, the device may be active, but in a sleep state, during transit to save power. During this time, the device may detect a tilt, fall, and/or vibration, or upon the expiration of a desired period to time and attempt to connect to the network. If the device cannot connect to the network, the device may return to the sleep state. At 708, when the device is delivered to the designated location, each storage unit automatically connects to the network via a hub or a smartphone without any user intervention. Upon detecting the first vibration, the device may connect to the hub and automatically begin tracking and collecting product usage data. The hub may transmit the unique identification and updates to the server regarding the location of the device. At 710, when the device detects a vibration, the device may receive the signal from the vibration sensor, including the duration of the tilt, the number of tilts, and the unique device identification. This data may be encapsulated and stored in a packet. When the device connects to the hub, a handshake happens between the hub and each label. The handshake may occur at a pre-determined interval or every time a vibration is measured. The packet may be encapsulated in the device identifier (UUID or SSID) response that the hub uses to identify the device communication. This may be performed in the initial handshake itself to save power. At 712, the original user, e.g., the manufacturer or distributor, may be notified via the application that the number of sheets in the collection has achieved the threshold amount. At 714, the end user, e.g., a retailer or consumer, may input the minimum number of sheets to be stored locally via the application. The end user may receive a notification when the number of sheets stored locally achieves this minimum number. The end user may program the device to automatically reorder or require user approval to reorder, At 716, the process described above 702-714, may be repeated and the device may automatically update the server with the new number of containers that were reordered.

The method of configuring and using the inventory management system may comprise calibrating a plurality of inventory management devices based on the calibration of a single inventory management device that is based on the sheet material, the thickness of sheet collection, etc. The device may be configured to automatically calibrate based on prior usage and/or stored data. For example, the device may comprise software to automatically calibrate the device based on, at least in part, prior usage data stored in the storage unit. The device may be configured to not measure or include in the calibration the change in capacitance during consumption of the material by the user from container.

After receiving the labels, the distillery may communicate with the labels via a hub to activate each label using an electrical switch, e.g., a reed switch, which connects the battery to the circuit to activate the label. The user may open the mobile application to connect to the server including the databases. The user may input the starting and ending label identifications as well as the product identification into the reference database. The server may transmit a calibration signal that is received by each of the labels. The calibration signal may include the threshold resistance value. The deployment database may be updated automatically with the product identification from the reference database. The product identification may be associated with the distillery identification.

The inventory management system may be characterized by one or more of the following: small size, flexibility, reusability and nonintrusive monitoring of the quantity of sheets in the collection. The small size and flexible inventory management system as described herein may comprise an electronic sticker on a flexible printed circuit board (PCB) or printed electronics. The reusable inventory management system as described herein may comprise the electronic sticker removably attached to a container. The inventory management system may be attached to a container of any shape and size. The nonintrusive inventory management system as described herein may be safely used for food materials and medicines by surmounting the inventory management device to an exterior surface of the container. For example, the electronic sticker may be removed from a first container and attached to a second container. The inventory management system may be used to manage the inventory for a wide variety of substances. The inventory management system may be used to monitor the number of sheets. The inventory management system may be configured to allow users to customize the ROP by positioning the inventory management device at the desired minimum sheets. The inventory management system may be automated when the sheet collection is configured onto the network.

The inventory management system may comprise an in-house power saving circuit such that the inventory management device lacks the need for frequent recharging. The inventory management system may be configured for a two-step inventory management process to list sheets that need to be refilled from a local supply and reordered or purchased.

EXAMPLES

The inventory management devices and methods of use described herein may be better understood when read in conjunction with the following representative examples. In this example, a hotel may place an order for 1000 toilet rolls to be used. The following examples are included for purposes of illustration and not limitation.

Example 1

Initial Setup of the Label

Figure 8:
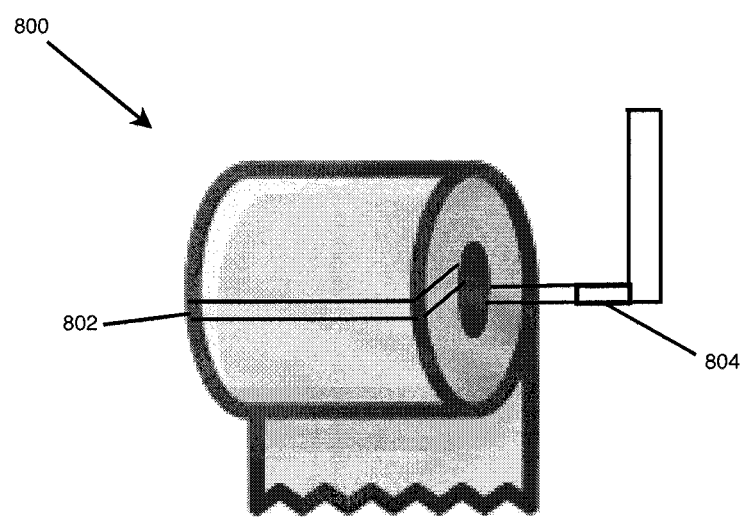
FIG. 8 is an exemplary diagram illustrating a roll of sheet with a resistive sensor.

As shown in FIG. 8, a capacitive sensor 802 may be positioned on the toilet roll stand 804. The reference database may be updated to include a specific threshold capacitance value for the toilet roll. The reference database may include the threshold capacitance value, name of the product, first capacitance value (capacitance of the roll when it has sheets) and second capacitance value (capacitance when the roll does not have sheets). The capacitance value may be converted into time of return pulse or program ticks. The deployment database may be updated as well. A resistive sensor 804 may be positioned on the toilet roll. The reference database may be updated to include the threshold resistance value, first resistance value (when the roll has sheets) and second resistance value (when the roll has lesser sheets then a threshold value). The deployment database may include a label identification, product identification, and reseller identification, e.g., the name of the seller selling the sheets. The label identification may include a UPC code. The label identification and sheet supplier identification may be updated before shipping the labels.

Example 2

Calibration of the Label by the User

After receiving the labels, the sheet supplier may communicate with the labels via a hub to activate each label using an electrical switch, e.g., a reed switch, which connects the battery to the circuit to activate the label. The user may open the mobile application to connect to the server including the databases. The user may input the starting and ending label identifications as well as the product identification into the reference database. The server may transmit a calibration signal that is received by each of the labels. The calibration signal may include the threshold capacitance value and resistance value. The deployment database may be updated automatically with the product identification from the reference database. The product identification may be associated with the distillery identification. The user may input the quantity of sheets in each roll.

Example 3

Transporting the Toilet Rolls to the End User

As described in the above examples, the labels may be activated by the user such that the labels are powered on but in a sleep state during transit to the bar. The power consumption may be reduced using one or more intelligent power saving strategies. For example, the label's controller may determine the period of time that the bottle is tilted. If this period of time is greater than a threshold value, e.g., 2 minutes, then the label may return to the sleep state. If this period of time is less than the threshold value, then the controller may transmit a signal to connect the label to a hub, and if the label cannot connect to the hub, the label may return to the sleep state.

Example 4

Use of the Inventory Management System by the End User

The hub at the bar may be configured to provide the network before the toilet roll arrives at the hotel. The hub may transmit updated database information, including the location of the hotel, from the server to the labels. As described above in Example 3, the labels may automatically connect to the network after the roll is vibrated. The end user may, but is not required to, connect the labels to the network. The end user may input the threshold number of sheets to trigger transmitting a reorder signal to the sheet supplier to reorder the product. When this threshold number is achieved, the end user may be notified by the server that the automatic reorder was placed with the sheet supplier by the system. Alternatively, the end user may be notified that the threshold number has been achieved so that the end user may place the reorder manually. The server may provide the sheet supplier a map view showing the number of bottles remaining at each location.

Example 5

Collecting Data

When the label is connected to the network via the hub, the label may measure and/or transmit device identifier information ("UUID" or "SSID"), including the label identification, status (e.g., the number of sheets in the roll), number of vibrations. At a predetermined time, such as each hour, the hub may transmit a signal to wake up each label causing each label to transmit the UUID. The hub may store the UUID. The hub may transmit the UUID to the server. The server may store the UUID. When the number of sheets achieves the threshold amount, a status of 0 is received by the hub at the bar and a notification is sent to the sheet supplier and updates the database.

Example 6

Deactivating the Label

The label may transmit a signal to be received by the database to cause the label to be deactivated in the database. For example, the signal sent to the sheet supplier to provide notice of the reorder may also deactivate the label in the database. Any information collected and/or transmitted by a deactivated label may be would be considered invalid. This may reduce the likelihood of the roll from being reused by the end user. The end user may remove the deactivated label from the bottle. After a reorder has been received by the sheet supplier, the user may begin again at Example 1 to reconfigure a new set of labels on the roll to be delivered to this hotel. When the new set of rolls is received by the hotel, the each new label may automatically connect to the network as described above.

While particular embodiments of inventory management devices have been illustrated and described, it would be obvious to those skilled in the art that various other changes and modifications can be made without departing from the spirit and scope of the invention. Those skilled in the art will recognize, or be able to ascertain using no more than routine experimentation, numerous equivalents to the specific devices, systems, and methods described herein, including alternatives, variants, additions, deletions, modifications and substitutions. This application including the appended claims is therefore intended to cover all such changes and modifications that are within the scope of this application.

The invention claimed is:

1. An inventory management device to measure usage of number of sheets in a roll, the inventory management device comprising:
   a resistive sensor in physical communication with a sheet in the roll to measure a resistance value between the resistive sensor and the sheet;
   a vibration sensor in electronic communication with the resistive sensor to generate a vibration signal that corresponds to vibration of the roll;
   a storage unit in electronic communication with the resistive sensor to store the resistance value;
   a controller in electronic communication with the resistive sensor and storage unit to measure a change in the resistance value;
   a transmitter in electronic communication with the controller to autonomously transmit an output signal when the controller measures the change in the resistance value to trigger a supply of sheets to automatically replenish the roll when the number of sheets is equal to or less than a threshold value; and
   a flexible battery to power the resistive sensor, vibration sensor, storage unit, controller, and transmitter.

2. The device according to claim 1, wherein the resistive sensor measures a first resistance value when number of sheets in the roll is above the threshold value.

3. The device of claim 1, wherein the resistive sensor measures a second resistive value when the number of sheets in the roll is less than or equal to a threshold number of sheets in the roll.

4. The device of claim 3, wherein, when the controller receives the vibration signal, the resistive sensor measures the second resistive value and the transmitter autonomously transmits the output signal.

5. The device of claim 3, wherein the change in resistance indicates that the number of sheets in the roll is less than or equal to a threshold number of sheets in the roll.

6. The device of claim 3, wherein when the controller receives the vibration signal, the resistance sensor measures the second resistance value, and the transmitter autonomously transmits the output signal when the controller measures a change in the resistance between the first resistance value and second resistance value.

7. The device of claim 3, wherein the controller is programmed to collect inventory information comprising an image sensor, moisture information, temperature information, humidity information, air quality information, light information, motion information, audio information, magnetic information, and combinations thereof.

8. The device of claim 3, wherein the first resistance value indicates a characteristic related to the material in the container including at least one of the material's composition and manufacturer.

9. The device of claim 1, wherein the transmitter comprises a radio transmitter including one of a LoRa transmitter and a NB-IoT transmitter.

10. The device of claim 1 comprising an environmental sensor to measure environmental data, wherein the environmental sensor is in electronic communication with the storage unit to store the environmental data, the controller, and the battery.

11. The device of claim 10, wherein the environmental data comprises one or more of an image, moisture, temperature, humidity, air quality, light, motion, sound, and magnetism.

12. A system to maintain an inventory of a material, the system comprising:
   at least a roll comprising a plurality of sheets;
   the inventory management device of claim 1 removably coupled to an exterior surface of the roll;
   a server in electronic communication with the inventory management device to receive the output signal and automatically communicate the output signal to at least one of a user and a vendor to effect automatic ordering of the material when the amount of material in the container is equal to or less than the threshold amount, and wherein a change in resistance between the first resistance value and the second resistance value indicates the amount of material in the container is less than or equal to a threshold number of sheets in the roll.

13. A method of detecting a number of sheets in a roll having the inventory management device of claim 1 removably coupled to an exterior surface of the roll, the method comprising:
   determining the number of sheets in the roll;
   detecting at least one vibration of the roll when a sheet is removed from the roll; measuring a change in the resistance between a first resistance value and a second resistance value;
   determining the amount of sheets in the roll is equal to or less than a second number of sheets in the roll based on the change in the resistance; and
   autonomously collecting inventory information; and automatically communicating the inventory information to effect automatic ordering of the roll when the number of sheets in the roll is equal to or less than the threshold amount.

14. The method of claim 13, wherein automatically communicating the inventory information comprises autonomously transmitting the inventory information to a vendor.

15. The method of claim 14, wherein autonomously transmitting the inventory information to the vendor comprises transmitting the inventory information via a radio transmitter including one of a LoRa transmitter and a NB-IoT transmitter.

16. The method of claim 14, wherein autonomously transmitting the inventory information to the vendor comprises transmitting the inventory information upon the expiration of a predetermined time period.

17. The method of claim 14 comprising deactivating the inventory management device upon transmission of the inventory information to the vendor.

18. The method of claim 13 comprising calibrating the inventory management device based on one of the material's capacitance data, and inventory information.

19. The method of claim 13 comprising activating the inventory management device from a sleep state to an active state when the controller receives the vibration signal greater than a threshold value.

20. A roll comprising a plurality of sheets and the inventory management device of claim 1 positioned at a reorder point within the plurality of sheets; and wherein the output signal triggers a sheet container comprising the supply of sheets to automatically replenish the sheets when the number of sheets is equal to or less than the threshold amount.

* * * * *